(12) United States Patent
Lee et al.

(10) Patent No.: US 6,285,427 B1
(45) Date of Patent: Sep. 4, 2001

(54) OPTICAL ALIGNING APPARATUS AND METHOD IRRADIATING MULTIPLE SUBSTRATES AT ONCE OR HAVING ROTATABLE ELEMENTS

(75) Inventors: Si Hyoung Lee; Sang Un Choi, both of Seoul (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/069,384

(22) Filed: Apr. 29, 1998

(30) Foreign Application Priority Data

May 3, 1997 (KR) .................................................. 97-17172

(51) Int. Cl.[7] .................................................. G02F 1/1337
(52) U.S. Cl. .................................................. 349/124
(58) Field of Search .................................................. 349/124

(56) References Cited

U.S. PATENT DOCUMENTS

| 5,464,669 | * | 11/1995 | Kang et al. | 349/124 |
| 5,467,214 | | 11/1995 | Heflinger et al. | 359/238 |
| 5,724,113 | * | 3/1998 | Bryan-Brown et al. | 349/124 |

FOREIGN PATENT DOCUMENTS 9642514    9/1996 (KR) .

* cited by examiner

Primary Examiner—Walter J. Malinowski
(74) Attorney, Agent, or Firm—Selitto, Behr & Kim

(57) ABSTRACT

An optical alignment apparatus and method are disclosed, the optical alignment apparatus, comprising the steps of: a light unit for generating a parallel beam; a beam-splitter for beam-splitting the parallel beam; and a beam regulator for changing the beam split from the beam-splitter into a polarized beam and irradiating the polarized beam to the alignment film on the LCD substrate.

25 Claims, 9 Drawing Sheets

OPTICAL ALIGNING APPARATUS AND METHOD IRRADIATING MULTIPLE SUBSTRATES AT ONCE OR HAVING ROTATABLE ELEMENTS

BACKGROUND OF THE INVENTION

This invention relates to an optical aligning apparatus of liquid crystals (LCs), and more particularly to an apparatus and a method for optically aligning LCs in a desired direction through control of the polarization direction of light.

To fabricate liquid crystal displays (LCDs) having uniform brightness and high contrast ratio, it should align LC molecules injected between upper and lower glass substrates in a constant direction. It is in general LCDs that LC molecules has been aligned in a constant direction through alignment films which are respectively formed on opposite surfaces of the upper and lower glass substrates. There have been used a conventional rubbing method and an UV alignment method as LC alignment techniques using alignment films. The conventional rubbing method which now is the most widely used as alignment techniques, aligns LCs with linear grooves formed in alignment films in a constant direction. In rubbing methods, polyimide as alignment films is coated on a transparent glass substrate of LCD and rubbed with a rubbing cloth in a constant direction, resulting in inducing physical defects on the surface of the polyimide to form linear grooves.

The UV alignment technique which utilizes polarized light differently from the mechanical rubbing technique, forms polyvinyl resin on a transparent glass substrate of an LCD and irradiates UV light to it, resulting in aligning LCs.

The conventional rubbing method has difficulties in adjusting a pretilt angle and achieving the reproducibility of process. Because the conventional rubbing method forms and rubs with a rubbing cloth polyimide on the surface of the glass substrate where TFT arrays or color filter arrays are arranged, it causes electrical and mechanical damages to the underlying TFT arrays and reduces the life time of LCDs due to particles and static electricity generated in rubbing. The UV alignment methods have difficulties in controlling residuum in polymerization by irradiation of UV light and fabricating uniform alignment films.

In Korean Patent Application No. 96-42514, there is disclosed an alignment method of "Method for aligning polymeric film, LC alignment method using the same, LC cell and fabrication thereof" to solve the problems of the conventional rubbing method and the UV alignment method.

To briefly speaking, the polymeric film alignment method forms the polymeric film doped with the photosensitive compound on a transparent glass substrate and irradiates the circularly polarized light to the polymeric film, resulting in tiltly aligning photosensitive compound with respect to the substrate surface. By using the polymeric alignment film, it is able to tiltly align LCs injected between two glass substrates with tilt alignment of the photosensitive compound contained within the polymeric alignment film. In the polymeric film alignment method, azo dye doped-polymeric alignment film was used for the photosensitive compound and circularly polarized beam was used for the irradiating light to the polymeric film instead of linearly polarized beam.

In order to align LCs using the above polymeric alignment film, there is a urgent need for an optical apparatus that polarizes beam from the light source into circularly polarized beam or elliptically polarized beam and irradiates the polarized light to the polymeric alignment film.

SUMMARY OF THE INVENTION

An object of the present invention is to provide an apparatus and method for optically aligning polymeric alignment films by controlling polarization direction of beam irradiated to the polymeric alignment films.

An another object of the present invention is to provide an apparatus and method for optically aligning LCs without rubbing.

A further object of the present invention is to provide an optical alignment apparatus and method capable of obtaining alignment films of excellent reproducibility and uniformity.

A still another object of the present invention is to provide an optical alignment apparatus and method capable of readily fabricating alignment films on LCD substrates of large area.

A still another object of the present invention is to provide an optical alignment apparatus and method capable of readily fabricating alignment films having a multi-domain structure with separate control of optical paths.

A still another object of the present invention is to provide an optical alignment apparatus and method capable of simply fabricating alignment films having a multi-domain structure on LCD substrates of large area.

According to the present invention, there is provided an optical alignment apparatus for aligning an alignment film on one sided surface of a LCD substrate, comprising: a light unit for generating a parallel beam; a beam-splitter for beam-splitting the parallel beam; and a beam regulator for changing the beam spilt from the beam-splitter into a polarized beam and irradiating the polarized beam to the LCD substrate.

In the optical alignment apparatus, the light unit includes a light source for generating a beam such as an Ar laser; and a parallel beam generating mean for changing the beam from the light source into the parallel beam such as a collimator. The LCD substrate is any one of a TFT substrate, color filter, or a LCD module. The polarized beam from the beam regulator of a polarizer irradiated to the LCD substrate is any one of a circularly polarized beam or an elliptically polarized beam. The alignment film is comprised of methyl orange-contained polyvinylalcohol.

The optical alignment apparatus may be any one of a substrate-rotated type that the light unit, the beam-splitter and the beam regulator are fixed and the LCD substrate is rotated on the light unit, beam-splitter and beam regulator or a substrate-fixed type that the LCD substrate is fixed and the light unit, beam-splitter and beam regulator are rotated on the LCD substrate.

The optical alignment apparatus further comprises an alignment mask arranged between the LCD substrate and the beam modulator, for selectively providing the polarized beam from the beam regulator to form multi domains. The alignment mask has a plurality of windows and parts of a plurality of windows are open with the domain number.

According to the present invention, there is provided an optical alignment apparatus for aligning an alignment film having multi domain on a LCD substrate, comprising: a light unit for generating a parallel beam; a beam-splitter for beam-splitting the parallel beam; a polarizer for polarizing the beam split from the beam-splitter into a polarized beam and irradiating the polarized beam to the alignment film on the LCD substrate; and an alignment mask arranged between the polarizer and the LCD substrate, for selectively irradiating the polarized beam to the LCD substrate.

According to the present invention, there is provided an optical alignment apparatus for aligning alignment films formed on one-sided surface of a plurality of LCD substrates, comprising: a light unit for generating a parallel beam; a plurality of beam-splitters for beam-splitting the parallel beam, respectively; and a plurality of polarizers for polarizing the beams split from the respective beam-splitters into polarized beams, respectively; wherein the alignment films on one-sided surface of the LCD substrates are simultaneously optically aligned.

According to the present invention, there is provided an optical alignment apparatus for aligning front alignment films and rear alignment films formed on front and rear surfaces of a plurality of LCD substrates, comprising: a light unit for generating a first parallel beam; a front alignment optical system for polarizing the first parallel beam received from the light unit into a first plurality of polarized beams having the same polarization direction, respectively and irradiating the plurality of polarized beams to the front alignment films on the plurality of LCD substrates; a beam reflection system for reflecting the first parallel beam to generate a second parallel beam which travels in the opposite direction to the first parallel beam; and a rear alignment optical system for polarizing the second parallel beam received from the beam reflection system into a second plurality of polarized beams having the opposite polarization direction to the first polarized beams, respectively and irradiating the second plurality of polarized beams to the rear alignment films on the plurality of LCD substrates; where the front alignment films and front alignment films on the front and rear surfaces of the LCD substrates are simultaneously aligned.

In the optical alignment apparatus, the alignment films on front and rear surfaces of the plurality of LCD substrates can be simultaneously aligned in the desired direction by setting the plurality of LCD substrates in same direction. On the contrary, the alignment films on front and rear surfaces of the plurality of LCD substrates can be aligned in opposite directions each other by setting parts of the plurality of LCD substrates in one direction and setting others in the opposite direction.

According to the present invention, an optical alignment apparatus for aligning an alignment film on one-sided surface of a LCD substrate, comprising: a light unit for generating a parallel beam; a plurality of beam-splitters for beam-splitting the parallel beam; and a plurality of polarizers for polarizing the beam split from the beam-splitters to a plurality of polarized beams having different polarization directions, respectively; wherein the plurality of polarized beams having different polarization directions are irradiated to the LCD substrate, resulting in aligning the alignment film having different alignment directions.

According to the present invention, an optical alignment apparatus for aligning front and rear alignment films on front and rear surfaces of a LCD substrate, comprising: a light unit for generating a first parallel beam; a front alignment optical system for polarizing the first parallel beam from the light unit into a first plurality of polarized beams having different polarization directions and irradiating the first plurality of polarized beams to the front alignment film; a beam reflection system for reflecting the first parallel beam to generate a second parallel beam which travels in the opposite direction to the first parallel beam; and a rear alignment optical system for polarizing the second parallel beam from the beam reflection system into a second plurality of polarized beams having different polarization directions and irradiating the second plurality of polarized beams to the rear alignment film; wherein the front and rear alignment films are simultaneously aligned in the different alignment directions by irradiating the first and second plurality of polarized beams to the front and rear alignment films, respectively.

In the optical alignment apparatus, the LCD substrate is any one of a TFT substrate, a color filter or a LCD module. The polarized beams irradiated to the LCD substrate are any one of circularly polarized beams or elliptically polarized beams. The optical alignment apparatus may be any one of a substrate-rotated type than the light unit, front and rear alignment optical systems and beam reflection system are fixed and the LCD substrate is rotated on the light unit, front and rear alignment optical systems and beam reflection system or a substrate-fixed type that the LCD substrate is fixed and the light unit, front and rear alignment optical systems and beam reflection system are rotated on the LCD substrate.

In the optical alignment apparatus, the front alignment optical system includes: a plurality of beam-splitters for beam-splitting the first parallel beam from the light unit; and a plurality of polarizers for polarizing the beams split from the beam-splitters into the first plurality of polarized beams; the rear alignment optical system includes: a plurality of beam-splitters for beam-splitting the second parallel beam from the beam reflection system; and a plurality of polarizers for polarizing the beams split from the beam-splitters into the second plurality of polarized beams; the beam reflection system includes a first mirror for reflecting the first parallel beam to a beam which travels in the perpendicular direction to the first parallel beam; and a second mirror for reflecting the beam to the second parallel beam which travels in the opposite direction to the first parallel beam and providing the second beam to the rear alignment optical system.

According to the present invention, there is provided an optical alignment method, comprising the steps of: providing a LCD substrate which the alignment film is formed on one-sided surface thereof; generating a parallel beam; beam-splitting the parallel beam; polarizing the split beam into a polarized beam; irradiating the polarized beam to the LCD substrate to align the alignment film.

According to the present invention, there is provided an optical alignment method, comprising the steps of: providing a LCD substrate which the front and rear alignment films are formed on front and rear surfaces thereof, respectively; generating a first parallel beam; beam-splitting the first parallel beam; polarizing the split beam into a first polarized beam; irradiating the first polarized beam to the LCD substrate to align the front alignment film; polarizing a second parallel beam which travels in the opposite direction to the first parallel beam to generate a second polarized beam; and irradiating the second polarized beam to the LCD substrate to align the rear alignment film.

In the optical alignment method, the step of generating the second parallel beam includes the steps of: first reflecting the first parallel beam into a beam which travels in the perpendicular direction to the first parallel beam and secondly reflecting the beam into the second parallel beam which travels in the opposite direction to the first parallel beam.

In the optical alignment method, the LCD substrate is any one of a TFT substrate, color filter, or a LCD module and the polarized beam irradiated to the LCD substrate is any one of a circularly polarized beam or an elliptically polarized beam. The alignment film is comprised of methyl orange-contained polyvinylalcohol.

According to the present invention, there is provided an optical alignment method, comprising the steps of: providing a LCD substrate which the alignment film is formed on one-sided surface thereof; generating a parallel beam; beam-splitting the parallel beam into a plurality of split beams; polarizing the plurality of split beams into a plurality of polarized beams having different polarization directions; and irradiating the plurality of polarized beams having different polarization directions to the LCD substrate to align the alignment film having different alignment directions.

According to the present invention, there is provided an optical alignment method, comprising the steps of: providing a LCD substrate which the front and rear alignment films are formed on both sided surfaces thereof; generating a first parallel beam; beam-splitting the first parallel beam into a plurality of split beams; polarizing the plurality of split beams into a first plurality of polarized beams having different polarization directions; irradiating the first plurality of polarized beams having different polarization directions on the from alignment film of the LCD substrate; reflecting the first parallel beam to generate a second parallel beam which travels in the opposite direction to the first opposite direction; beam-splitting the second parallel beam into a plurality of split beams; polarizing the plurality of split beams into a second plurality of polarized beams having different polarization direction; and irradiating the second plurality of polarized beams having different polarization direction to the rear alignment film.

According to the present invention, there is provided an optical alignment method, comprising the steps of: providing a plurality of LCD substrate; generating a first parallel beam; beam-splitting the first parallel beam into a plurality of split beams; polarizing the plurality of split beams into a first plurality of polarized beams; and irradiating the first plurality of polarized beams to the plurality of LCD substrates.

In optical alignment method, alignment films are formed on one sided surface of the plurality of LCD substrates. The first plurality of polarization beams may be any one of circularly or elliptically polarized beams in one polarization direction or any one of circularly or elliptically polarized beams in different polarization directions.

When alignment films are formed on both sided surfaces of the plurality of LCD substrates, respectively, the method further comprising the steps of: reflecting the first parallel beam to generate a second parallel beam which travels in the opposite direction to the first opposite direction; beam-splitting the second parallel beam into a plurality of split beams; polarizing the plurality of split beams into a second plurality of polarized beams having different polarization direction; and irradiating the second plurality of polarized beams having different polarization direction to the rear alignment film. The second plurality of polarization beams may be any one of circularly or elliptically polarized beams in one polarization direction or any one of circularly or elliptically polarized beams in different polarization directions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENT

An optical alignment apparatus of the present invention which changes molecule arrangement of photosensitive compound contained within an optical alignment film with polarization direction of light and tiltly aligns LCs to an surface of an LCD substrate with the molecule arrangement of the photosensitive compound, can be divided into a substrate-rotated type that an optical system is fixed and the LCD substrate is rotated to the optical system and a substrate-fixed type that the LCD substrate is fixed and the optical system is rotated to the LCD substrate.

Figure 1:
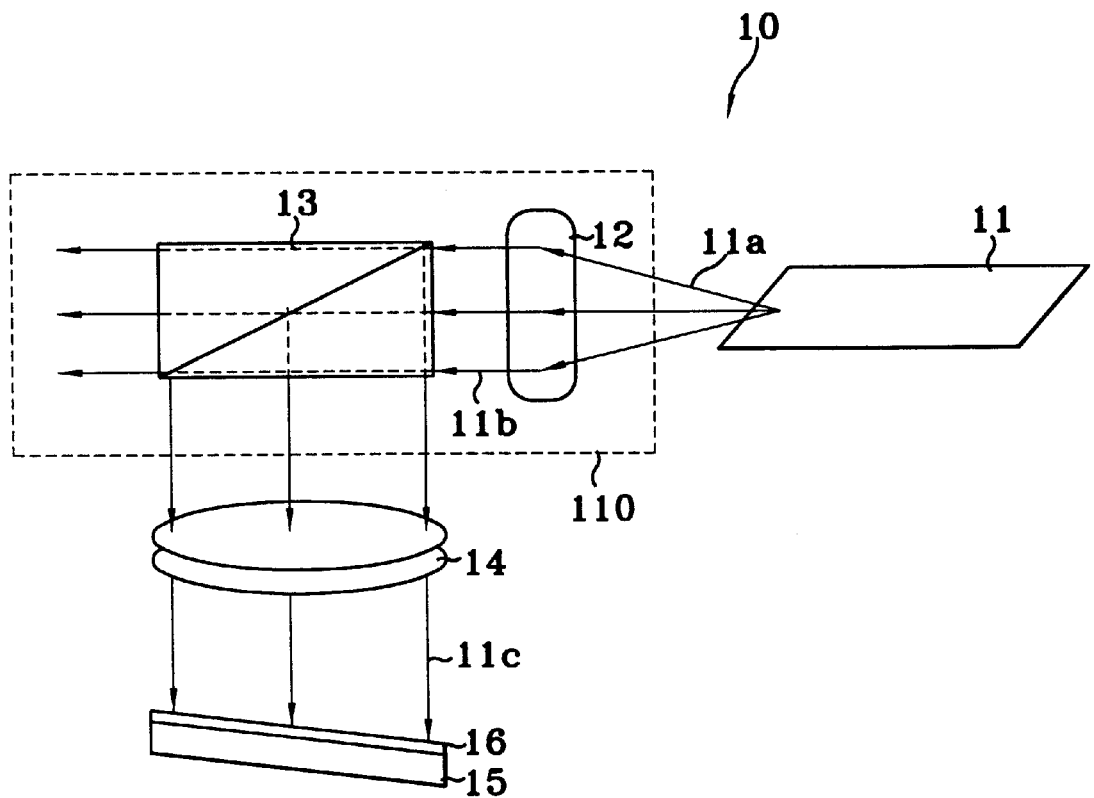
FIG. 1 is a schematic diagram of an optical alignment apparatus illustrating a first basic principle of an optical alignment for forming alignment films on an surface of a LCD substrate by moving the LCD substrate.

FIG. 1 is a schematic diagram illustrating the basic principle of an optical alignment apparatus of the present invention. The optical alignment apparatus of FIG. 1 is a substrate-rotated type for aligning photosensitive compound by rotating a LCD substrate 15 to a fixed optical system. The optical alignment apparatus 10 comprises a light source 11 for generating beam and a parallel beam generating unit 12 for changing the beam from the light source 11 into parallel beam. A collimator is used for the parallel beam generating unit 12.

The optical alignment apparatus 10 comprises a beam splitter 13 for beam-splitting the parallel beam and a beam regulator 14 for changing the beam split from the beam-splitter 13 into polarized beam and irradiating the polarized beam to the LCD substrate 15. The beam regulator 14 is composed of a polarizer which polarizes the split beam into circularly polarized beam or elliptically polarized beam and irradiates the polarized beam to the LCD substrate 15. In substrate-rotated optical alignment apparatus, the LCD substrate 15 mounted on a rotatable stage where the rotation angel is adjustable to the fixed optical system, not shown in drawings, includes a means for controlling the incident angle of the beam from the beam regulator 14.

Figure 2:
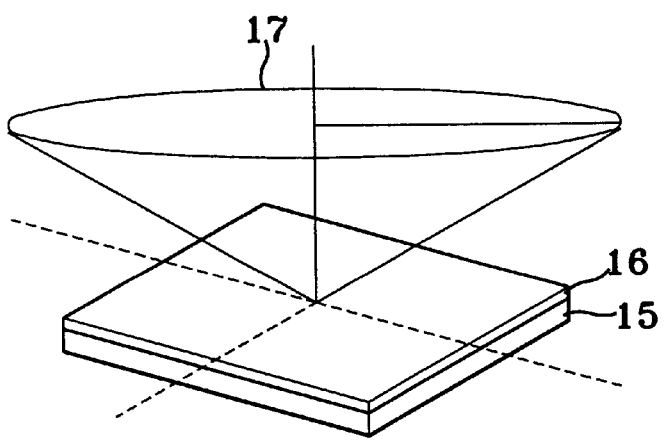
FIG. 2 is a diagram illustrating a control method of a rotation angle of a LCD substrate in an optical alignment using the optical alignment apparatus of FIG. 1.

FIG. 2 shows the incident angle of the beam irradiated to the LCD substrate 15 which the alignment film 16 is formed thereon. The rotation angel of the LCD substrate 15 is adjusted between the solid angle of a cone 17. The incident angle of the beam irradiated to the LCD substrate becomes different according to characteristics of LCDs to be manufactured and it should be adjusted according to the physical quality of LCs, alignment direction and the desired pretilt angle. The LCD substrate 15 includes the LC alignment film 16 which is formed thereon and a photosensitive polymeric film such as methyl orange-doped polyvinyl alcohol (MO/PVA) film is used for the LC alignment film 16.

According to the optical alignment apparatus 10, the parallel beam generating unit 12 changes the beam 11a generated from the light source 11 into the parallel beam 11b and the beam-splitter 13 beam-spitters the parallel beam 11b from the parallel beam generating unit 12. The beam regulator 14 polarizes the beam split from the beam-splitter 13 into the circularly polarized beam or elliptically polarized beam and irradiates the polarized beam 11c into the LCD substrate 15. The molecule arrangement of optical alignment film 16 formed on the LCD substrate 15 is changed. For example, in case where the polymeric film containing the photosensitive compound is used for the optical alignment film 16, if the polarized beam 11c is irradiated into the LCD substrate 15 through the beam regulator 14, molecules of the photosensitive compound contained in the polymeric alignment film 16 is tiltly aligned.

Therefore, by using the optical alignment apparatus, the LC molecules injected between upper and lower substrates can be aligned so as to have a desired pretilt angle with the tilt alignment of molecules of the photosensitive compound.

Figure 3:
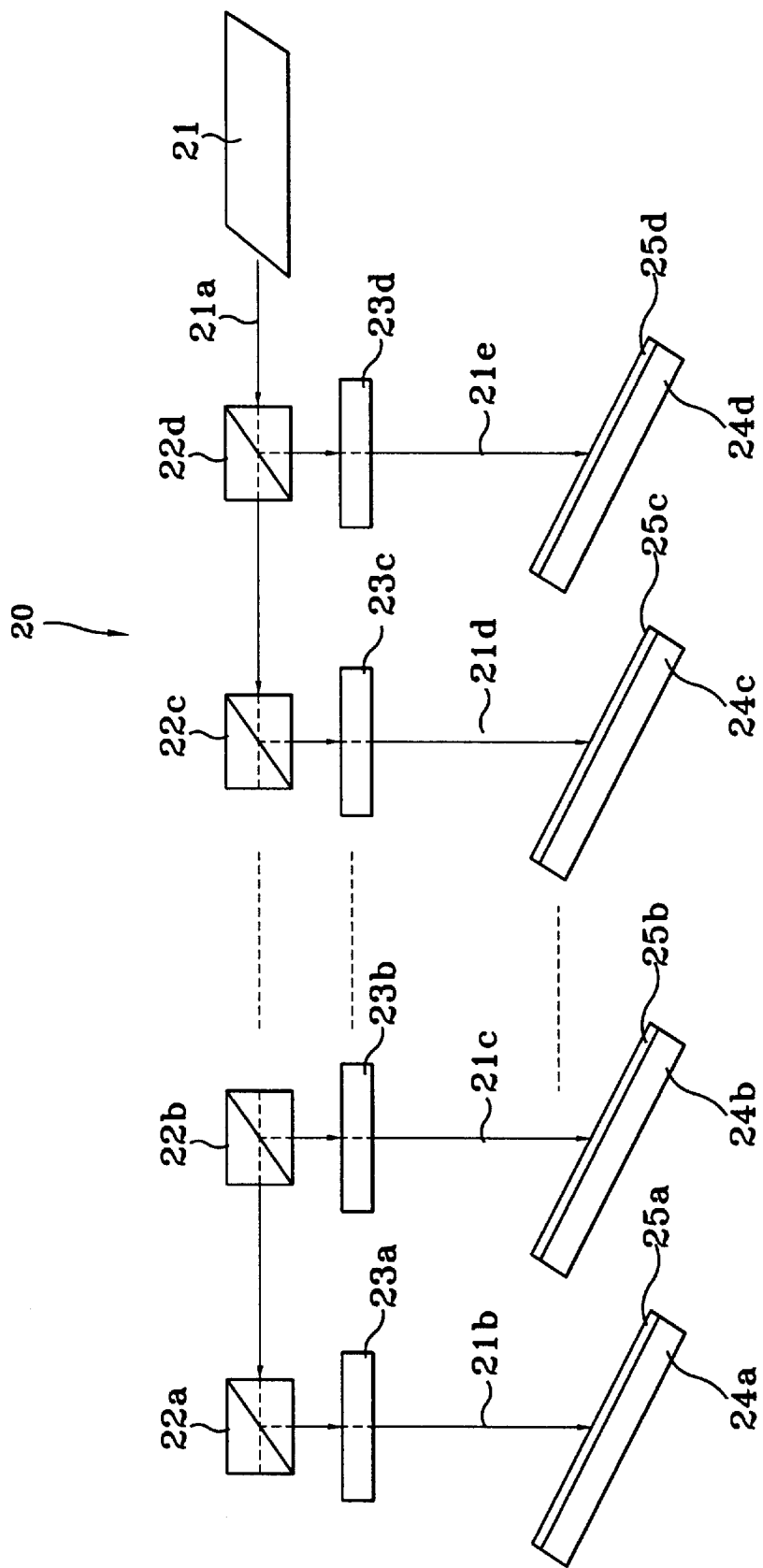
FIG. 3 is a schematic diagram of an optical alignment apparatus for simultaneously fabricating alignment films on one side surface of a plurality of substrates, using the first basic principle in accordance with a first embodiment of the present invention.

FIG. 3 is a schematic diagram of an optical alignment apparatus in accordance with a first embodiment of the present invention. The optical alignment apparatus of the first embodiment is a substrate-rotated type for simultaneously aligning alignment films which are respectively formed on the one-sided surface of a plurality of LCD substrates 24a–24d, for example on the front surface of LCD substrates. The optical alignment apparatus 20 of the first embodiment comprises a light unit 21 for generating parallel beam 21a, a plurality of beam-spitters 22a–22d for beam-splitting the parallel beam 21a and a plurality of polarizers 23a–23d for polarizing the beam split from the respective beam splitters 22a–22d into a circularly polarized beam or elliptically polarized beam and irradiating the polarized beam 21b to the respective LCD substrates 24a through 24d.

The molecules of optical alignment films 25a–25d which are respectively formed on the front surfaces of the plurality of LCD substrates 24a–24d are simultaneously tiltly aligned in the desired direction, when the polarized beams 21b from the plurality of the polarizers 23a–23d are irradiated to the front surfaces of the LCD substrates 24a through 24d, respectively. In optical alignment apparatus of FIG. 3, all the alignment films 25a–25d of the LCD substrates 24a–24d are aligned in one direction, provided that all the LCD substrates are set in the same direction as shown in FIG. 3. On the contrary, provided that parts of the plurality of LCD substrates 24a–24d are set in the first direction as shown in FIG. 3 and the others are set in the second direction opposite to the first direction, it enables the alignment films on the LCD substrates arranged in the first direction and the alignment films on the LCD substrates arranged in the second directions to be aligned in the opposite directions each other.

The light unit 21, not shown in FIG. 3, is composed of a light source for generating a beam and a parallel beam generating unit for changing the beam into the parallel beam 21a. An $Ar^+$ laser and a collimator are used for the light source and the parallel beam generating unit, respectively. Herein, each of a plurality of LCD substrates may be a TFT substrate, a color filter substrate or a LCD module.

Figure 4:
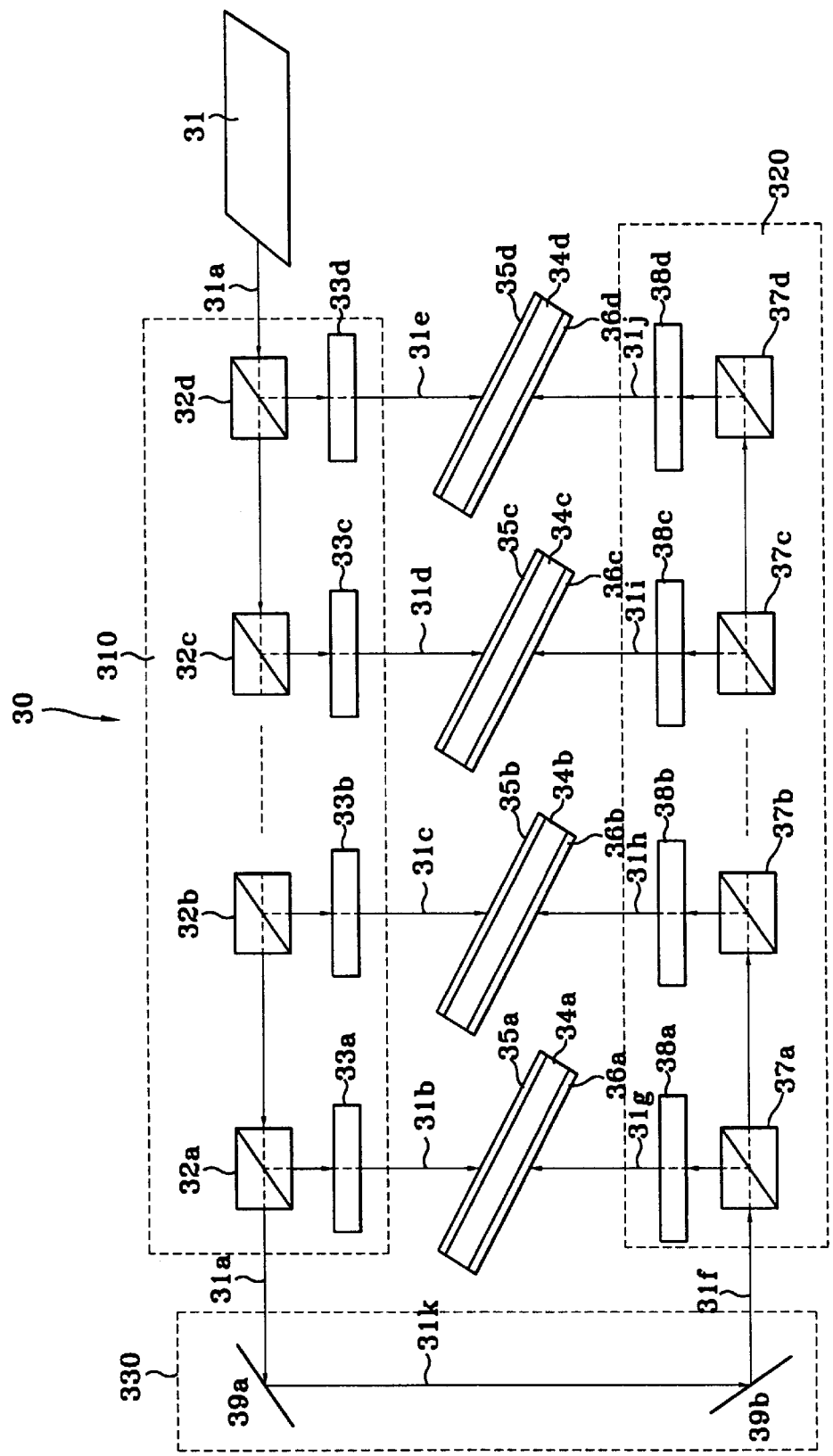
FIG. 4 is a schematic diagram of an optical alignment apparatus for simultaneously fabricating alignment films on both side surfaces of a plurality of LCD substrates in accordance with a second embodiment of the present invention.

FIG. 4 is a schematic diagram of an optical alignment apparatus in accordance with a second embodiment of the present invention. The optical alignment apparatus of the second embodiment is a substrate-rotated type for simultaneously aligning alignment films formed on both-sided surfaces of a plurality of LCD substrates 34a–34d. The optical alignment apparatus 30 of the second embodiment provides a plurality of LCD substrates 34a–34d which a first plurality of alignment films 35a–35d are formed on the front surfaces thereof, respectively and a second plurality of alignment film 36a–36d are formed on the rear surfaces thereof, respectively. Polarized beams 31b–31e and 31g–31j are irradiated to the first plurality of alignment films 35a–35d and the second plurality of alignment films 36a–36d formed on the both-sided surfaces of the LCD substrates 34a–34d, respectively.

The optical alignment apparatus of the second embodiment comprises a light unit 31 for generating a parallel beam 31a, a front alignment optical system 310 for polarizing the parallel beam 31a received from the light unit 31 into circularly polarized beams or elliptically polarized beams and irradiating the polarized beams 31b–31e to the first plurality of the alignment films 35a–35d formed on the front surfaces of the LCD substrates 34a–34d, respectively and a rear alignment optical system 320 for polarizing the parallel beam 31a received from the light unit 31 into circularly polarized beams or elliptically polarized beams and irradiating the polarized beams 31g–31j to the second plurality of the alignment films 36a–36d formed on the rear surfaces of the LCD substrates 34a–34d, respectively.

The front alignment optical system 310 comprises a plurality of beam-splitters 32a–32d for beam-splitting the parallel beam 31a received from the light unit 31 and a plurality of polarizers 33a–33d for polarizing the respective beams split from the beam-splitters 32a–32d into circularly polarized beams or elliptically polarized beams and irradiating the polarized beams 31b–31e to the respective alignment films 35a–35d on the front surfaces of the LCD substrates 34a–34d.

Similarly, the rear alignment optical system 320 comprises a plurality of beam-splitters 37a–37d for beam-splitting the parallel beam 31a received from the light unit 31 and a plurality of polarizers 38a–38d for polarizing the beams split from the respective beam-splitters 37a–37d into circularly polarized beams or elliptically polarized beams and irradiating the polarized beam 31g–31j to the respective alignment films 36a–36d on the rear surfaces of the LCD substrates 34a–34d.

The optical alignment apparatus 30 further comprises a beam reflection system 330 for reflecting the parallel beam 31a received from the light unit 31 and providing the reflected beam 31f which travels in the opposite direction to the parallel beam 31a to the rear alignment optical system 320. The beam reflection system 330 includes a first mirror 39a for reflecting the parallel beam 31a received from the light unit 31 to a parallel beam 31k which travels in perpendicular direction to the parallel beam 31a and a second mirror 39b for reflecting the parallel beam 31k to the parallel beam 31f perpendicular to the parallel beam 31k, thus the parallel beam 31f which travels in the opposite direction to the parallel beam 31a and providing the parallel beam 31f to the beam-splitters 37a–37d of the rear alignment optical system 320.

By using the optical alignment apparatus 30 of the second embodiment, the first plurality of the alignment films 35a–35d on the front surfaces of the LCD substrates 34a–34d are simultaneously aligned, provided that the polarized beams 31b–31e are respectively irradiated to the alignment films 35a–35d through the front alignment optical system 310. At the same time, the second plurality of the alignment films 36a–36d are simultaneously aligned, provided that the parallel beam 31a received from the light unit 31 is reflected through the beam reflection system 330 and polarized through the rear alignment optical system 320 and then the polarized beam 31g–31k are irradiated to the alignment films 36a–36d.

Accordingly, the optical alignment apparatus 30 of the second embodiment is capable of simultaneously aligning the alignment films 35a–35d and 36a–36d on the front and rear surfaces of the LCD substrates 34a–34d on the same optical axis. It is also capable of simultaneously aligning the alignment films formed on the upper and lower substrates under the assembly of a LCD module.

Besides, the optical alignment apparatus of the second embodiment can simultaneously align all the alignment films formed on the front and rear surfaces of the LCD substrates 24a–24d in one direction as shown in FIG. 4 by setting all the LCD substrates in the same direction. As well as it can align alignment films formed on the LCD substrates in the different directions by setting part of the LCD substrates in the same direction as shown in FIG. 4 and setting the others in the opposite direction.

The light unit 31, not shown in FIG. 4, is composed of a light source for generating a beam such as an $Ar^+$ laser and a parallel beam generating unit for changing the beam into the parallel beam 31a such as a collimator. Herein, each of a plurality of LCD substrates may be a TFT substrate, a color filter substrate or a LCD module.

Figure 5:
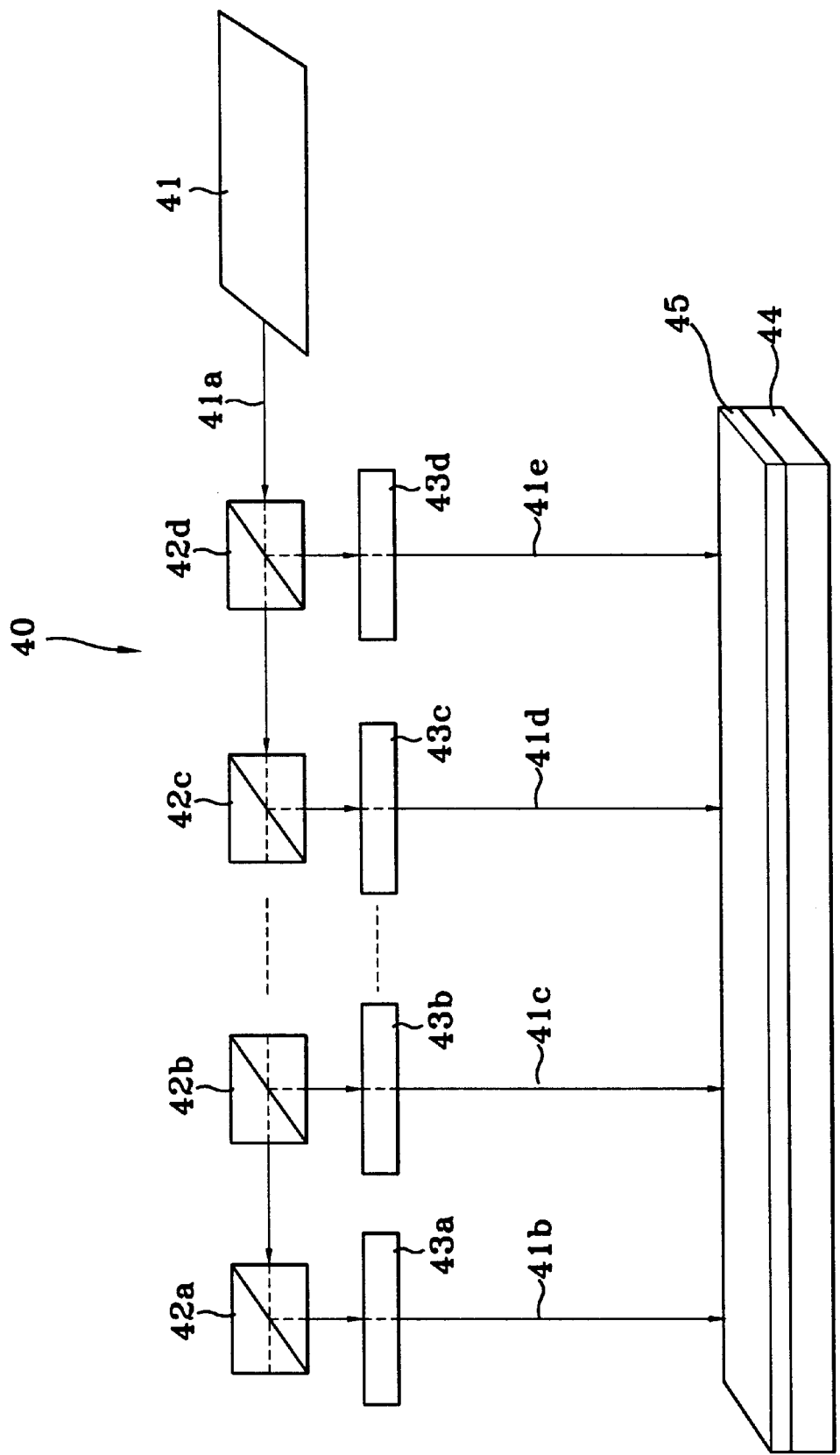
FIG. 5 is a schematic diagram of an optical alignment apparatus for simultaneously fabricating alignment films having different alignment directions on one-side surface of a plurality of LCD substrates in accordance with a third embodiment of the present invention.

FIG. 5 is a schematic diagram of an optical alignment apparatus in accordance with a third embodiment of the present invention. The optical alignment apparatus 40 of the third embodiment is a substrate-rotated type for aligning an alignment film 45 formed on one-sided surface of a LCD substrate 44 in the different polarization directions.

The optical alignment apparatus 40 of the third embodiment comprises a light unit 41 generating a parallel beam 41a, a plurality of beam-splitters 42a–42d for beam-splitting the parallel beam 41a, respectively and a plurality of polarizers 43a–43d for polarizing the beam split from the respective beam-splitters 42a–42d into circularly or elliptically polarized beams having different polarization directions, respectively and simultaneously irradiating the polarized beams 41b–41e to the alignment film 45 of the LCD substrate 44. At this time, the alignment film 45 is formed on only one-sided surface of the LCD substrate 44 and the polarized beams 41b–41e from the beam regulators 43a–43d are irradiated to the alignment film 45 with different polarization directions.

By using the optical alignment apparatus 40 of FIG. 5, it can form the alignment film 45 having partially different optical characteristics on one LCD substrate, provided that the polarized beams 41b–41e having different polarization directions are irradiated to the alignment film 45 formed on one-sided surface, for example the upper surface of the LCD substrate 44 through polarizers 43a–43d. The light unit 41, not shown in FIG. 5, is composed of a light source for generating a beam such as an $Ar^+$ laser and a parallel beam generating unit for changing the beam into the parallel beam 41a such as a collimator. Herein, the LCD substrate 44 may be a TFT substrate, a color filter substrate or a LCD module.

Figure 6:
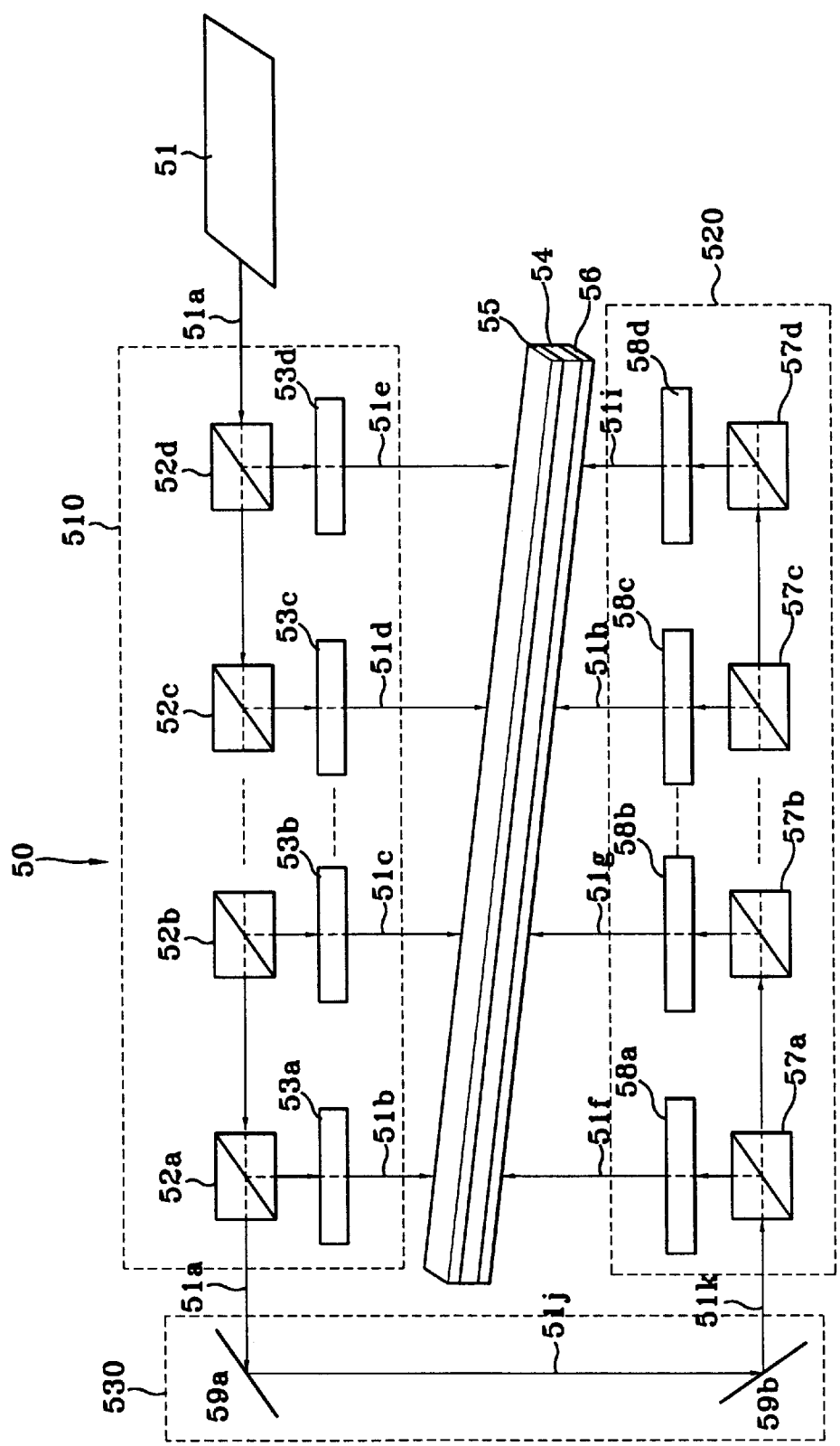
FIG. 6 is a schematic diagram of an optical alignment apparatus for simultaneously fabricating alignment films having different alignment directions on both side surfaces of a plurality of LCD substrates in accordance with a fourth embodiment of the present invention.

FIG. 6 is a schematic diagram of an optical alignment apparatus in accordance with a fourth embodiment of the present invention. The optical alignment apparatus 50 of the fourth embodiment is a substrate-rotated type for simultaneously aligning alignment films 55 and 56 formed on both-sided surfaces of a LCD substrate 54 in the different polarization directions.

Referring to FIG. 6, the optical alignment apparatus 50 of the fourth embodiment provides a LCD substrate 54 which alignment films 55 and 56 are formed on both-sided surfaces thereof. Beams 51b–51e and 51f–51i of having different polarization directions, which are one of circularly polarized beams or elliptically polarized beams, are respectively irradiated to the alignment films 55 and 56 formed on the front and rear surfaces of the LCD substrate 54. The optical alignment apparatus 50 comprises a light unit 51 generating a parallel beam 51a, a front alignment optical system 510 and a rear alignment optical system 520.

The front alignment optical system 510 polarizes the parallel beam 51a received from the light unit 51 into circularly or elliptically polarized beams 51b–51e in the first polarization direction and irradiates the polarized beams 51b–51e to the alignment film 55 formed on the front surface of the LCD substrate 54. The rear alignment optical system 520 polarizes the parallel beam 51k into circularly or elliptically polarized beams 5f–51i in the second polarization direction and irradiates the polarized beams 5f–51i to the alignment film 56 formed on the rear surface of the LCD substrate 54. The polarized beams 52f–51i have a different polarization direction from the polarized beam 51b–51d from the front alignment optical system.

The front alignment optical system 510 comprises a plurality of beam-splitters 52a–52d for beam-splitting the parallel beam 51a, respectively and a plurality of polarizers 53a–53d for polarizing the beam split from the respective beam-splitters 52a–52d into circularly or elliptically polarized beams 5b–51e, respectively and simultaneously irradiating the polarized beams 51b–51e to the alignment film 55 on the front surface of the LCD substrate 54. Similarly, the rear alignment optical system 520 comprises a plurality of beam-splitters 57a–57d for beam-splitting the parallel beam 51k and a plurality of polarizers 58a–58d for polarizing the beam split from the respective beam-splitters 57a–57d into circularly or elliptically polarized beams, respectively 51f–51i and irradiating the polarized beam 51f–51i to the alignment film 56 on the rear surface of the LCD substrate 54.

The optical alignment apparatus 50 further comprises a beam reflection system 530 for reflecting the parallel beam 51a received from the light unit 51 and providing the reflected parallel beam 51k which travels in the opposite direction to the parallel beam 51a to the rear alignment optical system 520. The beam reflection system 530 includes a first mirror 59a for reflecting the parallel beam 51a received from the light unit 51 to a parallel beam 51j which travels in perpendicular direction to the parallel beam 51a and a second mirror 59b for reflecting the parallel beam 51j to the parallel beam 51k perpendicular to the parallel beam 51j, thus the parallel beam 51k which travels in the opposite direction to the parallel beam 51a and providing the parallel beam 51k to the beam-splitters 57a–57d of the rear alignment optical system 520.

In the optical alignment apparatus 50 of the fourth embodiment, the alignment films 55 and 56 having different alignment directions each other are formed on both-sided surfaces of the LCD substrate 54. The polarized beams 51b–51e having the same polarization direction from the polarizers 53a–53d of the front alignment optical system 510 are irradiated to the alignment film 55 and the polarized beams 51f–51i from the polarizers 58a–58d of the rear alignment optical system 520 having the same polarization direction which is different from the polarized beams 51b–51e, are irradiated to the alignment film 56.

Accordingly, the optical alignment apparatus 50 of FIG. 6 can form the alignment films 55 and 56 having different optical characteristics on both-sided surfaces of the LCD substrate 54 by irradiating the polarized beams 51b–51e and 51f–51i having different polarization directions each other to the alignment films 55 and 56.

The light unit 51, not shown in FIG. 6, is composed of a light source for generating a beam such as an Ar$^+$ laser and a parallel beam generating unit for changing the beam into the parallel beam 51a such as a collimator. Herein, the LCD substrate 54 may be a TFT substrate, a color filter substrate or a LCD module.

Figure 7:
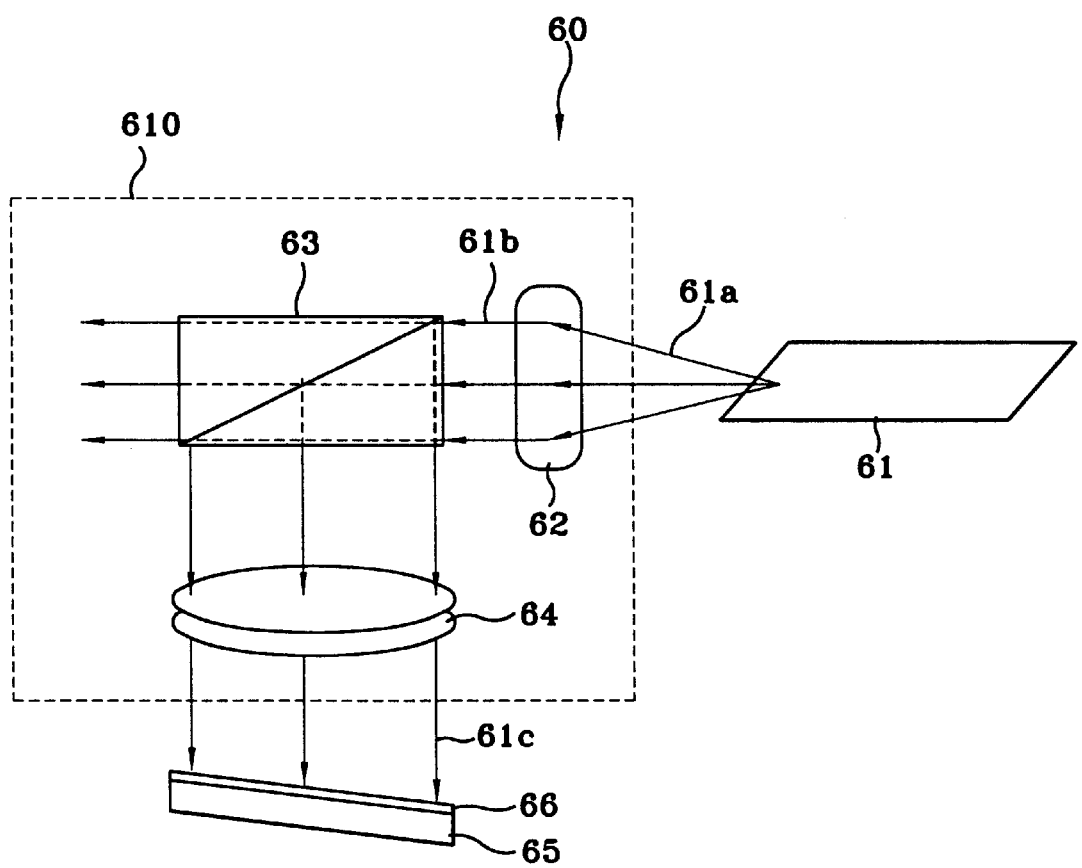
FIG. 7 is a schematic diagram of an optical alignment apparatus illustrating a second basic principle of an optical alignment for forming alignment films on an surface of a LCD substrate by fixing the LCD substrate.

FIG. 7 illustrates another basic principle of the optical alignment of the present invention. An optical alignment apparatus 60 according to another basic principle is a substrate-fixed type for optically aligning an alignment film 66 on a LCD substrate 65 by rotating a light source 61 and an optical system 610 on the fixed LCD substrate 65. Thus, so as to optically align, the substrate-fixed optical alignment apparatus 60 irradiates a polarized beam 61c to the LCD substrate 65 by rotating the light source 61 and the optical system 610 on condition that the LCD substrate 65 is fixed. By using the substrate-fixed optical apparatus 60, it can align alignment films in like manners as FIG. 3 through FIG. 6.

The optical alignment apparatus 60 provides the fixed LCD substrate 65 which the alignment film 66 is formed on one-sided surface thereof, a light source 61 for generating a beam 61a and a rotatable optical system 610 for irradiating a circularly or elliptically polarized beam 61c to the fixed LCD substrate 65. In substrate-fixed optical alignment apparatus 60, not shown in drawings, the light source 61 and optical system 610 are rotatable to the fixed LCD substrate 65 and the rotation angle of the light source 61 and the optical system 610 and the incident angle of the beam 61c to the LCD substrate 65 are adjustable.

The optical system 610 comprises a parallel beam generating unit 62 for changing the beam 61a into a parallel beam 61b, a beam-splitter 63 for beam-splitting the parallel beam and a beam regulator 64 for changing the beam split from the beam-splitter 63 into a polarized beam 61c and irradiating the polarized beam 61c to the alignment film 66 on the LCD substrate 65. An Ar$^+$ laser and a collimator are used for the light source 61 and the parallel beam generating unit 62, respectively. The beam regulator 64 is a polarizer which polarizes the beam from the beam-splitter 63 to the circularly or elliptically polarized beam 61c.

The alignment films on the LCD substrate can be optically aligned by using the substrate-fixed type optical alignment apparatus of FIG. 7, in like manners as FIG. 3 through FIG. 6.

Figure 8:
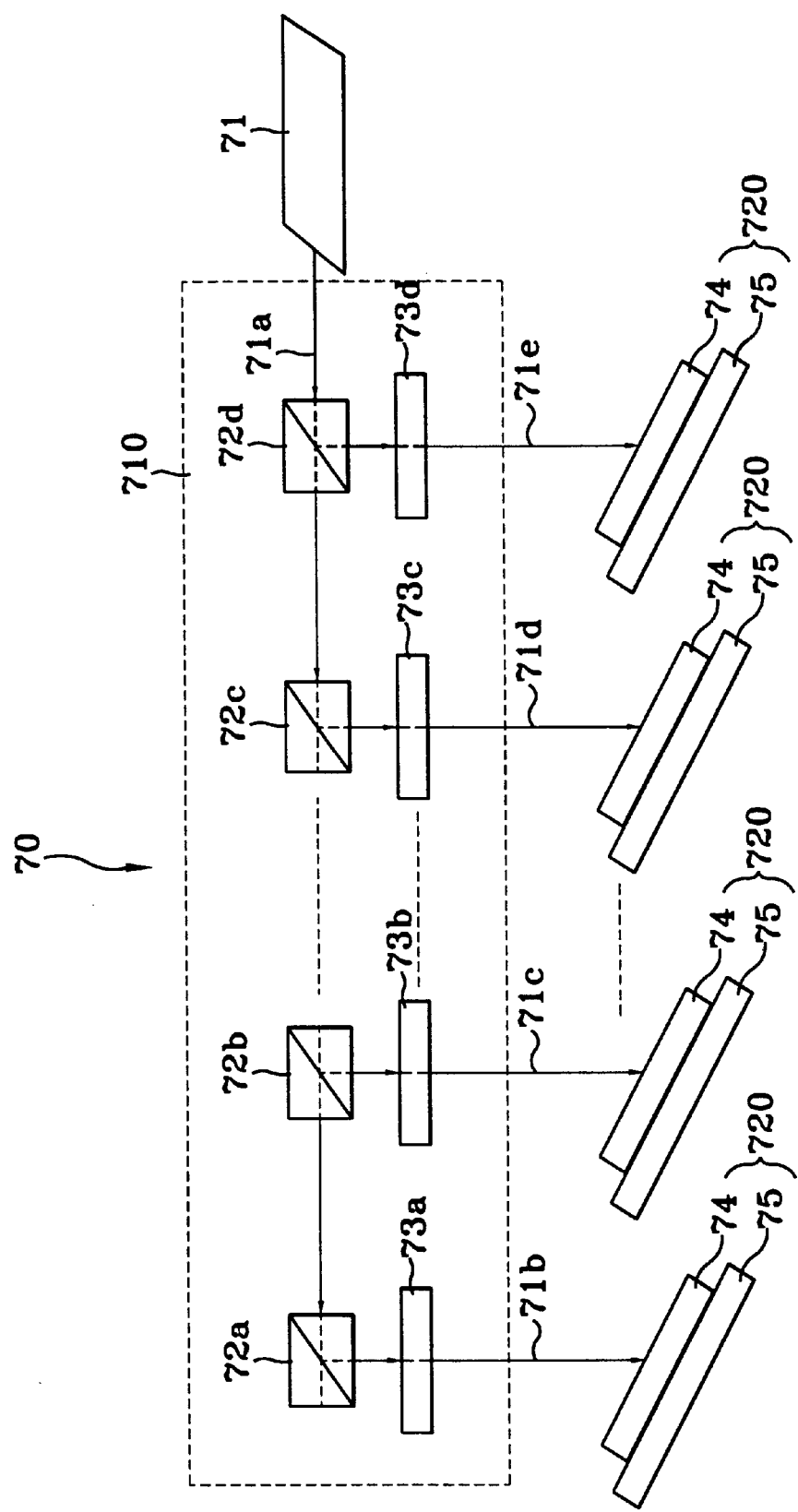
FIG. 8 is an example of the optical alignment apparatus adapted to LCD modules.

FIG. 8 illustrates an application example of an optical alignment apparatus of the present invention to a LCD module. The optical alignment apparatus 70 provides a light unit 71, an optical system 710 and a LCD module 720. The optical alignment apparatus 70 can any one of a substrate-rotated type that rotates the LCD module 720 on the light unit 71 and the optical system 710 or a substrate-fixed type that rotates the light unit 71 and the optical system 710 on the fixed LCD module 720. Not fully shown in FIG. 8, LCs are injected between upper and lower substrates 74 and 75 of the LCD module 720.

In case where it aligns a single LCD module, the optical alignment apparatus 70 may comprise the optical system including a beam-splitter 72 and a beam modulator 73 and a single LCD module 720. In case where it aligns plural LCD modules, the optical alignment apparatus may be comprises the optical system 710 including a plurality of beam-splitters 72a–72d for beam-splitting the parallel beam 71a received from the light unit 71 and a plurality of beam regulators 73a–73d and a plurality of LCD modules 720. The light unit 71, not shown in FIG. 8, is comprised of a light source for generating a beam such as an Ar$^+$ laser and the parallel beam generating unit for changing the beam to the parallel beam 71a. Each of the beam regulators is a polarizer which polarizes the beam from the beam-splitter to the circularly or elliptically polarized beam 71b–71e. Provided that the optical alignment apparatus 70 irradiates each polarized beams 71b–71e to each LCD modules 720, molecules of alignment films on upper and lowers substrates 74 and 75 are arranged with the polarization direction of the beams 71b–71e and then LC molecules between the upper and lower substrates 74 and 75 are optically aligned with the molecule arrangement of the alignment film.

Figure 9:
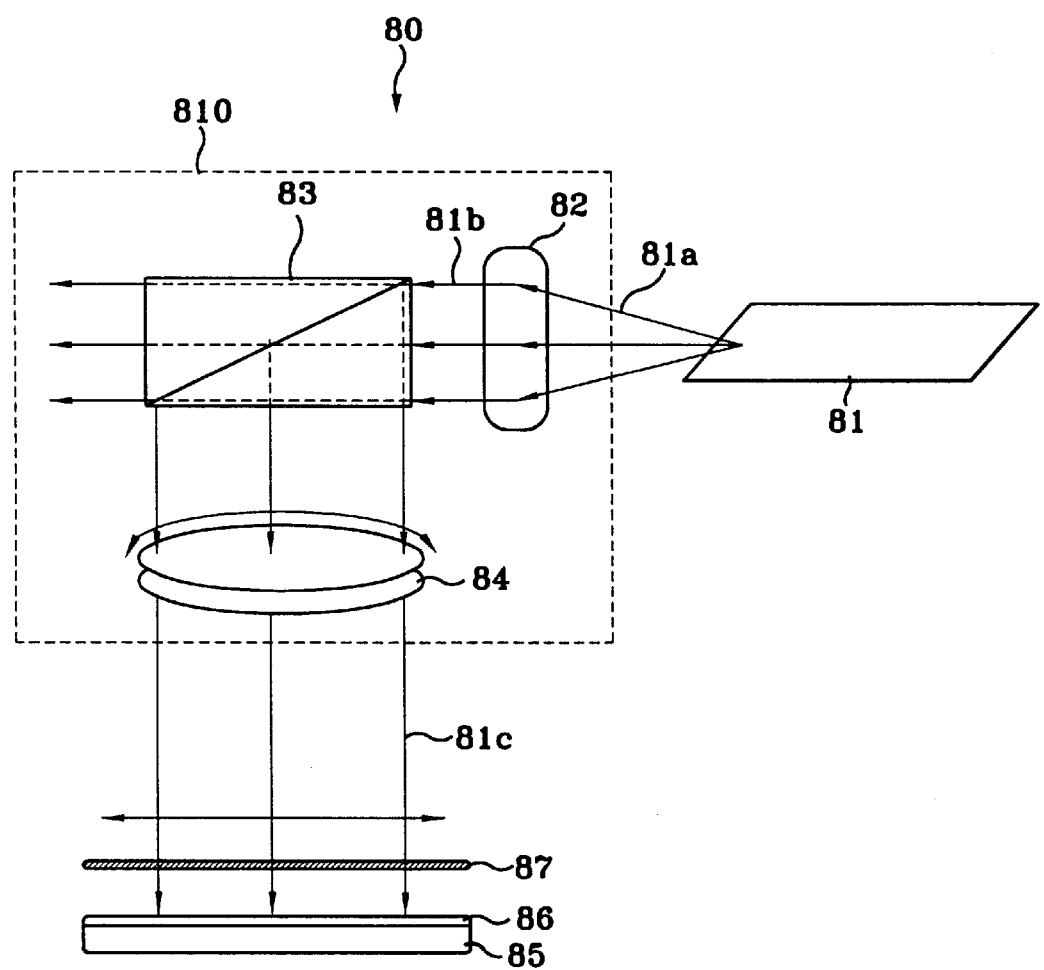
FIG. 9 is a schematic diagram of an optical alignment apparatus using an alignment mask in accordance with a fifth embodiment of the present invention.

FIG. 9 shows an optical alignment apparatus 80 for forming multi domains in one pixel of a LCD substrate. The optical alignment apparatus 80 of FIG. 9 comprises a light source for generating beam 81a, an optical system 810 for irradiating a polarized beam 81c to a LCD substrate 85 which an alignment film 86 is formed thereof and an alignment mask 87 which is arranged between the optical system 810 and the LCD substrate 85, for selectively providing the polarized beam 81c to the LCD substrate 85. The alignment mask 87 has plural windows where parts are open.

Figure 10:
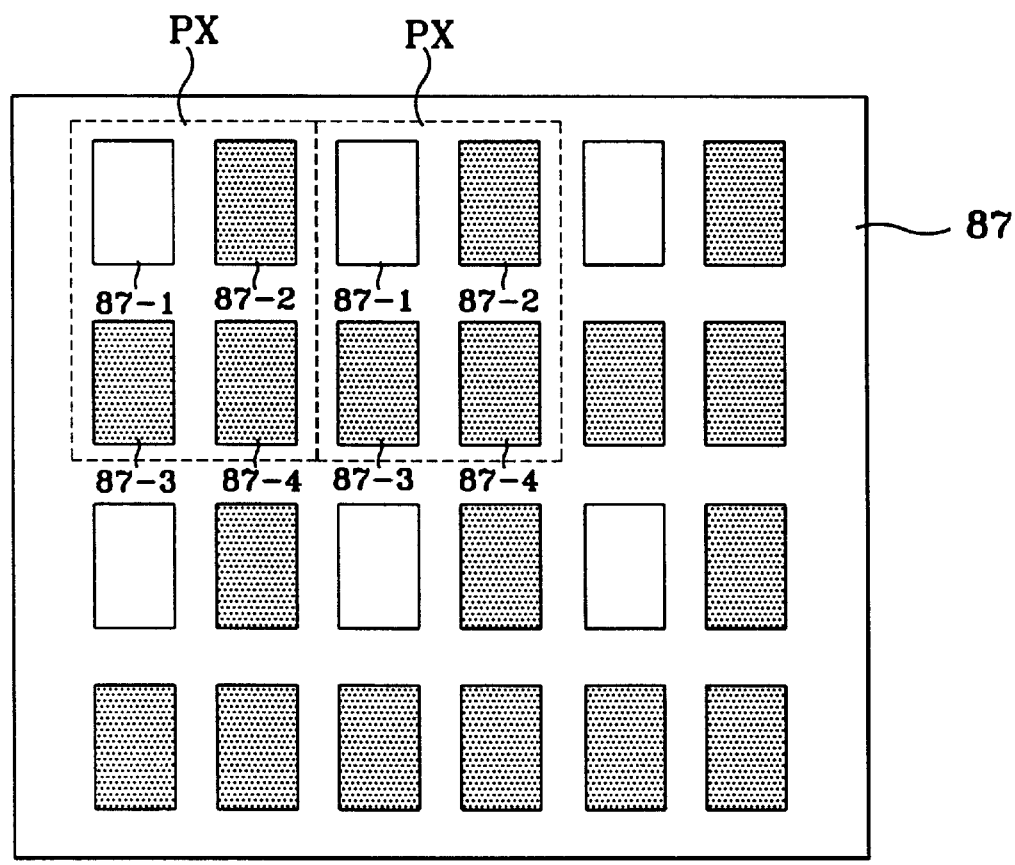
FIG. 10 is an example of the alignment mask of FIG. 10.

The optical system 810 has the same construction and operation as the optical systems of above embodiments and the required number of windows formed in the alignment mask 87 is determined by the number of domains which are formed in one pixel. For example, the alignment mask 87 of FIG. 10 is forming 4-domains in one pixel PX and has 4 windows 87-1 through 87-4.

The method for forming 4 domains in one pixel PX by using the optical alignment apparatus 80 including the alignment mask 87 is as follows. If the circularly or elliptically polarized beam 81c is irradiated to the LCD substrate 85 through the optical system 810 on condition that one 87-1 of 4 windows 87-1–87-4 is open and the other windows 87-2 through 87-4 are not open, the polarized beam 81c is irradiated to the LCD substrate 85 through the window 87-1, resulting in forming a first domain only in the exposed area of the pixel PX corresponding to the window 87-1.

Subsequently, the window 87-1 opened of the alignment mask 87 is shifted to the next domain-forming area of the pixel PX and the polarized beam 81c from the optical system 810 is irradiated to the LCD substrate 85 through the alignment mask 87, resulting in forming a second domain in the exposed area of the pixel PX corresponding to the window 87-1. If above process is repeatedly carried out, it is capable of forming multi domains for example, 4 domains in one pixel. The windows which are open are determined with the domain number.

As above described, by using the optical alignment apparatus of the present invention, molecules of the alignment films can be optically aligned and the LCs injected between upper and lower substrates can be optically aligned so as to have a desired pretilt angle with the molecule arrangement.

According to the present invention, it is capable of forming defect-free and uniform alignment films and obtaining an excellent reproducibility by rubbing-free alignment technique. Because LCs are aligned by controlling the polarization direction of light, it can simplify the fabrication processes and readily form multi domains, resulting in simplifying the fabrication process of wide-viewing angle LCDs. The optical alignment apparatus makes possible LC alignment before and after assembly of LC modules and fabrication of mass-producible LCDs of high quality.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. An optical alignment apparatus for aligning an alignment film formed on a side surface of an LCD substrate by aligning photosensitive molecules contained in the alignment film in a desired orientation, comprising:
   a light unit for generating a parallel beam;
   a beam-splitter for beam-splitting the parallel beam; and
   a beam regulator for changing a beam split from the beam-splitter into a polarized beam and irradiating the polarized beam to the alignment film on the LCD substrate such that the photosensitive molecules of the alignment film are aligned in a desired tilt angle, wherein the light unit, the beam-splitter and the beam regulator are rotatable relative to the LCD substrate.

2. The optical alignment apparatus as claimed in claim 1, wherein the light unit includes a light source for generating a beam; and a parallel beam generating means for changing the beam from the light source into the parallel beam.

3. The optical alignment apparatus as claimed in claim 2, wherein the light source is an Ar+ laser; and wherein the light unit and the beam regulator include a collimator and a polarizer, respectively.

4. The optical alignment apparatus as claimed in claim 1, wherein the LCD substrate is any one of a TFT substrate, a color filter substrate and a LCD module.

5. The optical alignment apparatus as claimed in claim 1, wherein the polarized beam irradiated to the LCD substrate is any one of a circularly polarized beam and an elliptically polarized beam.

6. The optical alignment apparatus as claimed in claim 5, wherein the alignment film is comprised of methyl orange-contained polyvinylalcohol.

7. The optical alignment apparatus as claimed in claim 1, wherein the light unit, the beam-splitter and the beam regulator are fixed and the LCD substrate is rotatable relative to the light unit, the beam-splitter and the beam regulator.

8. The optical alignment apparatus as claimed in claim 1, wherein the LCD substrate is fixed and the light unit, the beam-splitter and the beam regulator are rotatable relative to the LCD substrate.

9. The optical alignment apparatus as claimed in claim 1, further comprising an alignment mask arranged between the LCD substrate and the beam regulator for selectively providing the polarized beam from the beam regulator to the LCD substrate to form multi-domains.

10. The optical alignment apparatus as claimed in claim 9, wherein the alignment mask has a plurality of windows having a number of open windows corresponding to the number of domains present in the multi-domains.

11. An optical alignment apparatus for aligning alignment films formed on side surfaces of a plurality of LCD substrates by aligning photosensitive molecules contained in the alignment films in a desired orientation, comprising:
   a light unit for generating a parallel beam;
   a plurality of beam-splitters for beam-splitting the parallel beam; and
   a plurality of polarizers, each of which is positioned for polarizing a split beam transmitted from a corresponding one of the beam-splitters into a polarized beam and for irradiating the polarized beam to a corresponding one of the alignment films, the polarizers being arranged so as to irradiate the polarized beams simultaneously to the alignment films, whereby the alignment films are optically aligned simultaneously.

12. The optical alignment apparatus as claimed in claim 11, wherein the LCD substrates are any one of TFT substrates, color filter substrates and LCD modules.

13. The optical alignment apparatus as claimed in claim 12, wherein the polarized beams irradiated to the LCD substrates are any one of circularly polarized beams and elliptically polarized beams.

14. The optical alignment apparatus as claimed in claim 13, wherein the light unit, the beam-splitters and the polarizers are fixed and the LCD substrates are rotatable relative to the light unit, the beam-splitters and the polarizers.

15. The optical alignment apparatus as claimed in claim 13, wherein the LCD substrates are fixed and the light unit, the beam-splitters, and the polarizers are rotatable relative to the LCD substrates.

16. The optical alignment apparatus as claimed in claim 15, wherein the alignment films on the plurality of LCD substrates are simultaneously aligned in a desired direction by setting the plurality of LCD substrates in an identical direction.

17. The optical alignment apparatus as claimed in claim 15, wherein the alignment films on the plurality of LCD substrates are aligned in opposite directions from each other by setting at least one of the plurality of LCD substrates in one direction and setting at least another one of the plurality of LCD substrates in another direction.

18. An optical alignment method, comprising the steps of:
   forming alignment films on a plurality of LCD substrates, the alignment films having photosensitive molecules;
   generating a first parallel beam;
   beam-splitting the first parallel beam into a plurality of split beams;
   polarizing the plurality of split beams into a first plurality of polarized beams; and
   aligning the photosensitive molecules of the alignment films by irradiating the first plurality of polarized beams to the alignment films.

19. The method as claimed in claim 18, wherein the alignment films are formed on side surfaces of the plurality of LCD substrates.

20. The method as claimed in claim 19, wherein the first plurality of polarized beams are any one of beams circularly polarized in one polarization direction and beams elliptically polarized in one polarization direction.

21. The method as claimed in claim 19, wherein the first plurality of polarized beams are any one of beams circularly polarized in different polarization directions and beams elliptically polarized in different polarization directions.

22. The method as claimed in claim 18, where the alignment films are formed on front and rear surfaces of the plurality of LCD substrates.

23. The method as claimed in claim 22, further comprising the steps of:

reflecting the first parallel beam to generate a second parallel beam which travels in an opposite direction with respect to the first parallel beam;

beam-splitting the second parallel beam into a plurality of second split beams;

polarizing the plurality of second split beams into a second plurality of polarized beams; and irradiating the second plurality of polarized beams to the alignment films formed on the rear surfaces of the plurality of LCD substrates.

24. The method as claimed in claim 23, wherein the second plurality of polarized beams are any one of beams circularly polarized in one polarization direction and beams elliptically polarized in one polarization direction.

25. The method as claimed in claim 23, wherein the second plurality of polarized beams are any one of beams circularly polarized in different polarization directions and beams elliptically polarized in different polarization directions.

* * * * *